Figure 1:
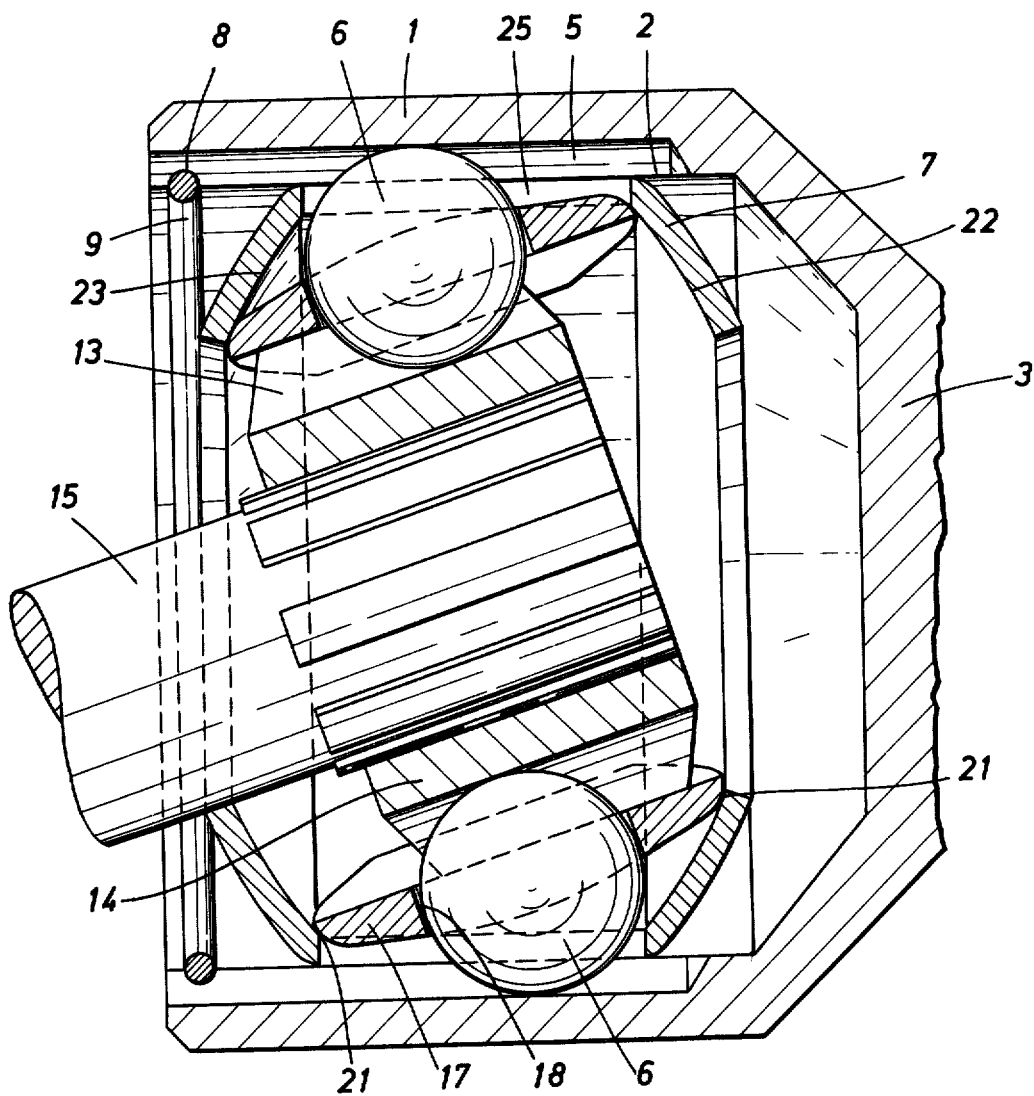

United States Patent [19]
Tampalini

[11] 3,875,762
[45] Apr. 8, 1975

[54] SYNCHRONIZING TORQUE-TRANSMITTING UNIVERSAL JOINT

[76] Inventor: Giuseppe Tampalini, Corso Magenta 33, Brescia, Italy

[22] Filed: Oct. 29, 1973

[21] Appl. No.: 410,496

[30] Foreign Application Priority Data
Oct. 31, 1972  Germany............................ 2253460

[52] U.S. Cl. ........................ 64/21; 64/8; 308/194
[51] Int. Cl. ............................................. F16d 3/30
[58] Field of Search........ 64/21, 8, 9 A, 7; 308/194, 308/201

[56] References Cited
UNITED STATES PATENTS

| | | | |
|---|---|---|---|
| 3,357,207 | 12/1967 | Orain | 64/8 |
| 3,522,714 | 8/1970 | Wildhaber | 64/21 |
| 3,789,626 | 2/1974 | Girguis | 64/21 |

*Primary Examiner*—Samuel Scott
*Assistant Examiner*—Randall Heald
*Attorney, Agent, or Firm*—Kurt Kelman

[57] ABSTRACT

The joint comprises an outer member and an inner member disposed therein and having respective longitudinal axes. They are pivotally movable between positions in which the longitudinal axes include different angles and are telescopically slidable relative to each other. The outer member has an inside peripheral surface and the inner member has an outside peripheral surface respectively formed with straight grooves extending parallel to the respective longitudinal axes of the member. Torque-transmitting rolling elements are disposed between the inside and outside peripheral surfaces and adapted to be guided in the respective grooves and to move in a plane which bisects the angle included by the longitudinal axes and thus to cause both members to rotate at the same speed. A plurality of guiding elements each associated with a respective one of the rolling elements are slidably guided on the outside peripheral surface between the guiding grooves therein. A guiding cage is disposed in the outer member and is axially slidable relative thereto but incapable of a pivotal movement relative thereto. The guiding cage is in sliding contact with the inside peripheral surface and defines inside guiding surfaces arranged to guide said guiding elements so as to cause them to constrain the rolling elements to move in the plane.

3 Claims, 4 Drawing Figures

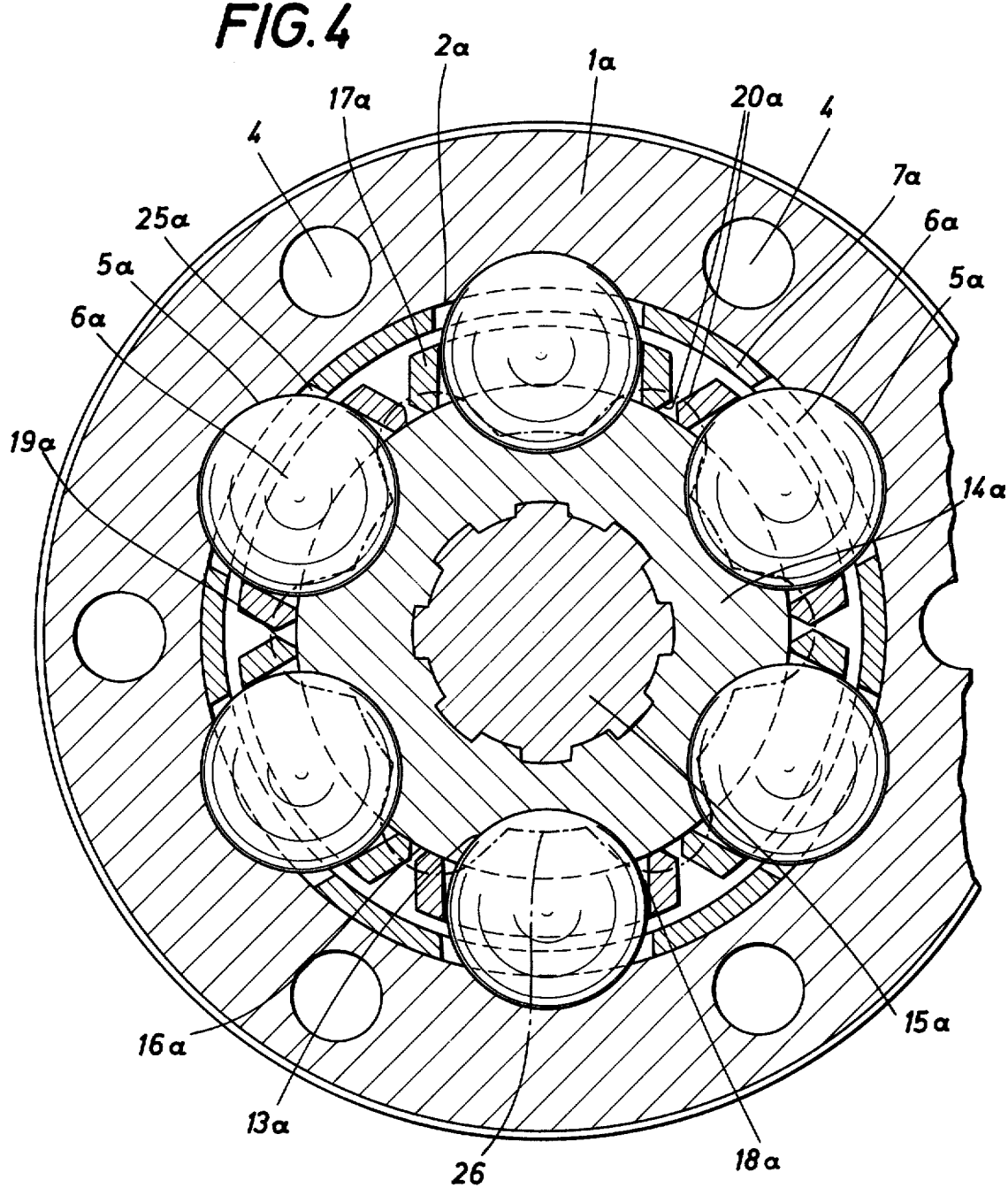

SYNCHRONIZING TORQUE-TRANSMITTING UNIVERSAL JOINT

This invention relates to a synchronizing torque-transmitting universal joint which comprises an outer member and an inner member, pivotally movable and telescopically slidable relative to each other and formed with straight guiding grooves which are parallel to the axis of the respective members and serve to guide torque-transmitting rolling elements, which are constrained by respective guiding elements, to move in a plane of synchronizing motion, which bisects the angle included by the axes of the member, the guiding elements being slidably mounted on the inner member and being controlled by guiding surfaces which are incapable of a pivotal movement relative to the outer member.

Such torque-transmitting joints are mainly used to drive motor vehicle wheels, subjected to widely different dynamic actions and stresses as the torque is transmitted to the wheel. To be able to reliably resist such dynamic loads in operation, such torque-transmitting joints must permit of an easy pivotal movement and telescopic sliding movement of the members with low friction. To compensate for the manufacturing tolerances of the wheel suspension means, the axial displacement made possible by the torque-transmitting joint should be as large as possible although the length of the joint should be minimized.

In a known torque-transmitting joint (Printed German Application No. 1,300,373), the balls which are disposed in grooves which extend in the outer and inner members parallel to the respective axes thereof are held on both sides by profiled circular discs which are L-shaped in cross-section and have one flange which is spherically curved and slidingly bears on the inside surface of the outer member whereas the other flange guides the balls during a pivotal movement and is in sliding contact with a crowned surface of the inner member and at its end is held by crowned discs secured to the wheel axle. Relative to the inner member, these guide elements can perform a pivotal movement over one-half of the angular movement of the joint but cannot be strictly axially displaced so that the axial displacement of this articulated joint during an axial movement of the rolling elements is relatively small. Because one circular disc on each side serves as a controlling and guiding element for all balls at the same time, the circular discs must be manufactured and machined with high precision if excessive stress concentrations which are due to manufacturing tolerances are to be kept within limits. As such peak stresses cannot be compensated automatically because the circular discs are integral, a prolonged operation will result in an increased wear at locally restricted areas and the wear at these portions may result in higher peak stresses in other angular positions.

Another known synchronizing torque-transmitting universal joint (U.S. Pat. No. 3,522,714) is provided with a guide for each torque-transmitting ball but it has the disadvantage that the guiding elements are held at the inner member so that the balls are also incapable of rolling during a longitudinal displacement. In that arrangement, too, the inner member has crowned guiding surfaces which extend along its longitudinal axis and support guide blocks which are axially slidable in the outer member. The distances from those surfaces of the guiding elements which cooperate with the crowned surfaces of the inner member to the ball-guiding surfaces is relatively large so that considerable tilting moments result which vary with the product of this distance and the corresponding component of the force which acts on the ball.

Another torque-transmitting joint of the kind defined first hereinbefore (U.S. Pat. No. 3,166,919) has guiding elements which consist of components that are pillow-shaped in cross-section and are slidably guided in mating axial grooves formed in the inner member and have hemispherical recesses to hold the balls. The crowned outside surfaces of the guiding elements are held by resilient lugs of two rings, which are fixed in the outer member, so that these guiding elements are axially restrained relative to the outer member. As a result of this axial restraint, the inner member can perform only a very small axial displacement relative to the outer member.

It is an object of the invention to provide a synchronizing torque-transmitting universal joint which is of the kind defined first hereinbefore and, while the torque-transmitting balls perform mainly a rolling movement, permits of an adjustment of its members over axial distances which are relatively large relative to the overall dimensions of the joint in such a manner that a longitudinal displacement of at least 60% of the axial length of the outer member is possible when the inner and outer members include an angle of at least 18°.

This object is accomplished with a torque-transmitting joint wherein each guiding element associated with a rolling element is guided on the periphery of the inner member between the guiding grooves thereof and that the guiding surfaces controlling the guiding elements are provided on the inside surface of a separate guiding cage which is axially slidably mounted in the outer member.

Because each guiding element is guided on the periphery of the inner member, the same may be displaced in the direction of its axis relative to the guiding elements regardless of the angle of the joint. Because the guiding cage which cooperates with the guiding elements is additionally displaceable in the axial direction of the outer member, the total range within which the two members can be displaced relative to each other is about twice the range which is afforded in known designs. Because the guiding elements for controlling the balls are adjustable relative to both members, the balls perform mainly a rolling motion during a pivotal movement or an axial displacement. In such an operation, the controlling forces acting on the balls do not produce transverse components because, according to a preferred feature of the invention, the point of contact between each guiding element and the guiding cage and the center of the associated rolling element lie approximately on a straight line which is parallel to the axis of the inner member so that the guiding elements engage each ball on a great circle thereof.

An axial displacement of one member in the other causes the guiding cage to be displaced relative to the outer member only by a fraction of the relative displacement of the members.

In known synchronizing torque-transmitting joints, a small angle between the members may cause a jamming of the balls in the guiding grooves. According to a preferred feature of the invention, this disadvantage is eliminated by so designing the guiding surfaces that they cause the balls to move to an actual position which leads the position theoretically corresponding to the displacement. This lead in conjunction with the control of each ball by the separate guiding elements prevents the jamming of the balls even when the members include a vary small angle. In a practical embodiment, the guiding surfaces have an involute shape.

Another practical advantage of the synchronizing torque-transmitting universal joint resides in that the dimensions of the joint may be selected to match those of known synchronizing torque-transmitting universal joints which have already become standardized because they have been made in large numbers. As a result, the joints according to the invention may be installed without need for an alteration in design or known joints may be replaced by joints according to the invention.

Figure 2:
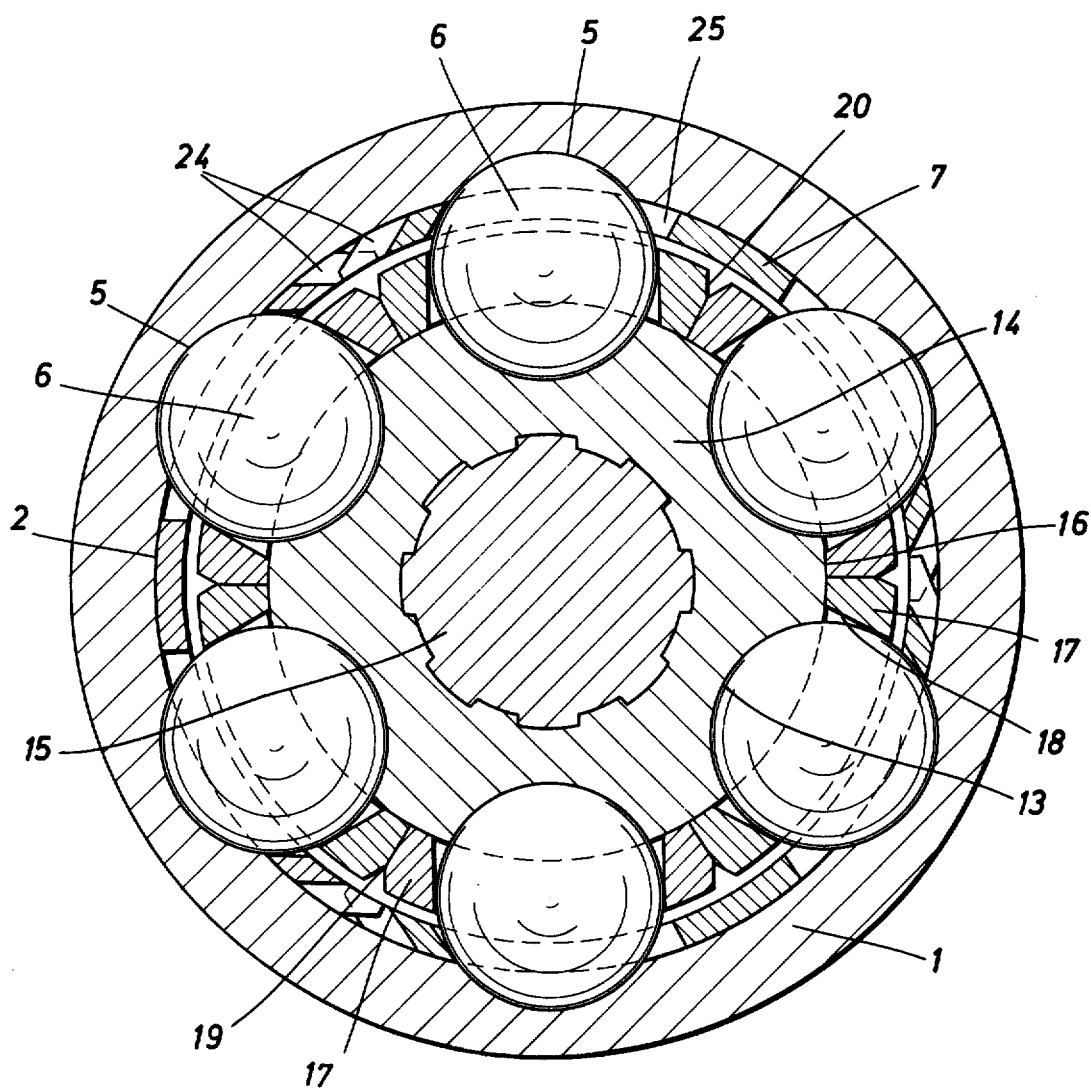
Figure 3:
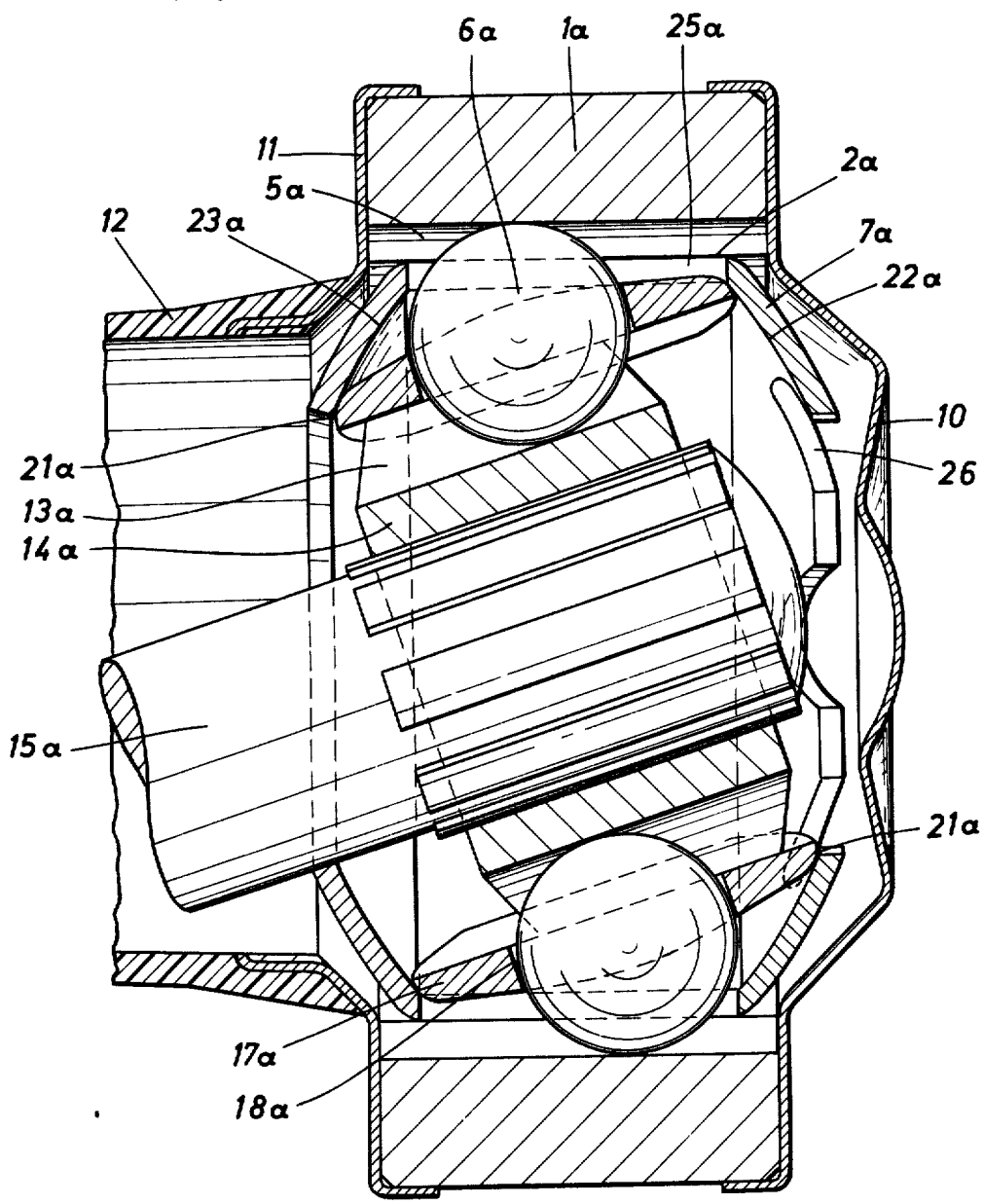

Embodiments of the invention will now be explained more fully with reference to the drawing, in which FIG. 1 is a longitudinal sectional view showing the synchronizing torque-transmitting universal joint according to the invention with the members thereof including an angle, FIG. 2 is a transverse sectional view showing the joint of FIG. 1 in basic position, FIG. 3 is a longitudinal sectional view showing another embodiment of the synchronizing torque-transmitting universal joint according to the invention, and FIG. 4 is a transverse sectional view showing the joint of FIG. 3.

The joint which is shown in the drawing comprises an outer member 1, 1a which has a cylindrical bore 2, 2a. The member 1 shown in FIGS. 1 and 2 is bell-shaped and at its top 3 is integrally formed with a stub shaft having external teeth. According to FIGS. 3 and 4, the outer member 1a consists of a cylindrical disc and is provided with bores 4, through which screws may be fitted, which connect the disc to the end flange of a shaft. Alternatively, the outer member 1, 1a may be connected to a shaft by a welded joint or may be positively connected to the shaft by profiled outer teeth or keys or splined joints.

The outer member 1, 1a has grooves 5, 5a, which are parallel to the axis of the member and serve to guide balls 6, 6a or other rolling elements. According to FIGS. 1 and 2, the guiding grooves 5 5a terminate before the inner end of the bore 2 2a of the member 1 1a.

In special embodiments, the bore 2, 2a may have the shape of a regular polygon in cross-section. The bore serves to guide a guiding cage 7, 7a for an axial displacement.

According to FIGS. 1 and 2, the axial displacement of the guiding cage 7 is limited by the inner end of the bore 2 and by a stop ring 9 inserted in an annular groove 8. According to FIGS. 3 and 4, the outer member 1a is axially shorter than the member 1 so that the range of the axial displacement of the guiding cage 7a is shorter and is limited at one end of the outer member 1a by a closed cap 11 which carries a sealing cup 12. Alternatively, cover caps may be used which have a rim which has recesses in registry with the guiding grooves 5, 5a so that the movements of the balls are not disturbed.

The balls 6, 6a are also guided in guiding grooves 13, 13a formed in an inner member 14, 14a and parallel to the axis thereto. The inner member 14, 14a is either integral with a shaft 15, 15a or is connected thereto frictionally or by a profiled joint, screw joint, key or splined joint, or welded joint.

Because the straight guiding grooves 5, 5a and 13, 13a which are formed in the outer and inner members, extend parallel to the axis of the respective member, these grooves can be made at reasonable cost by broaching or by a non-cutting shaping, for instance, by extruding, sizing, or sinter-forging. The guiding grooves have in cross-section the shape of an ellipse having a radial major axis. In this way a transmission of force at the corners of the guiding groove is avoided; such transmission of force could cause a breaking away of the edge portion which defines the guiding groove so that the universal joint would be destroyed.

In a normal case, each universal joint comprises six torque-transmitting balls 6, 6a because the use of balls in this number results in a normal case in an optimum overall volume of a joint having a given torque-transmitting capacity. The balls may be used in any other number if this is required.

The inner member 14, 14a has basically the shape of a cylinder or a regular polygonal prism. Its outside surfaces 16, 16a disposed between the ball-guiding grooves 13, 13a form guiding surfaces for ball guiding elements 17, 17a. A separate guiding element 17, 17a is provided for each ball and has a bore 18, 18a receiving associated ball 6 or 6a. The walls of the bores guiding the balls contact the same adjacent to a great circle thereof. In the embodiment shown in FIGS. 1 and 2, the guiding elements 17 are formed on their longitudinal sides with sliding surfaces 19 which contact each other. Alternatively, as shown in FIGS. 3 and 4, the guiding elements 17a may be arranged with a clearance between them or with surfaces which are only in linear contact. The longitudinal sides are formed with bevelled surfaces 20, 20a to facilitate the supply of lubricant to the relatively displaceable surfaces of the guiding elements and the inner member 14, 14a.

The guiding elements 17, 17a are formed at their longitudinal ends with guided surfaces 21, 21a, which are guided by guiding surfaces 22, 23 or 22a, 23a of the guiding cage 7, 7a.

The guiding elements 17, 17a consist of sintered or sinter-forged parts. They serve only to transmit guiding forces and are subjectd only to small mechanical stresses.

As is shown in FIGS. 1 and 2, the guiding cage 7, 7a consists of an assembly of drawn or punched sheet steel parts. According to FIGS. 1 and 2, the cage comprises three sections formed with serrated side edges 24 which interengage to connect the sections in a unit and are held together in bore 2 of the outer member 1. The guiding cage 7, 7a is formed with cut-outs 25, 25a adjacent to the longitudinal grooves 5, 5a. These cut-outs may be made by the same punching operation which is used to form the serrated end faces 24. As is apparent from FIG. 2, these cut-outs and the serrations are formed by a punching operation proceeding in one direction. Instead of serrations used to connect the cage sections, these may be connected by an endless or split ring non-rotatably mounted in a groove formed in the inside wall of the cage. The cut-out 25, 25a need not be made with high precision because they have substantially no control functions but must only enable an axial displacement of the balls. Because the two cut-out of a cage section are made by a punching operation in one and the same direction, the two outer walls of the ball-guiding cut-out can be caused to engage the ball 6 or 6a so that the cage is held against rotation.

According to FIGS. 3 and 4, the cage 7a is made in one piece and is formed on one side with an assembling opening which enables the introduction of the inner member 14a when the guiding elements 7a have been inserted into the cage. In small joints, the cage 7a consists of a pressed sheet steel part. In larger joints, the cage may alternatively consist of a casting, a die casting or a forging. Because, when the members of the joint include an angle (FIG. 3), the inner member 14a can engage the control cage 7a only in one direction, care must be taken to ensure that the longitudinal displacement of the inner member 14a or the shaft 15a connected thereto is limited by an engagement with the cap 10. The engagement with the cap 10 and the matching with the annular cap 11 forming a stop for the cage prevent a contact between the parts and a hooking of the inner member or the guiding elements (see approach in the lower part of FIG. 3) in the opening 26 of the cage 7a in case of an extreme displacement of the inner member and the cage.

As has already been mentioned, the balls are guided in the bores 18, 18a of the guiding elements 17, 17a. These guiding forces are substantially transmitted at a great circle of the balls so that the guiding forces are transmitted substantially through the center of each ball and do not produce transverse components. The center distances of the guided surfaces 21, 21a contacting the guiding surfaces 22, 23, 22a, 23a from the longitudinal axis of the inner member 14, 14a are approximately equal and correspond to the distance from the ball centers to said axis. In the embodiment shown by way of example, the guiding forces act virtually in the direction of the generatrices of an imaginary cylinder of revolution about the longitudinal axis of the inner member. Alternatively, the arrangement may be such that the guiding forces adjacent to each guiding element act along a generatrix of a cone of revolution, which generatrix extends through or close to the ball center and has relative to the longitudinal axis of the inner member an inclination amounting, e.g., to one-half of the average angle of the joint.

The curvature of the guiding surfaces 22, 23 or 22a, 23a of the guiding cage 7, 7a follows an involute so that, in case of an angle between the inner member 14, 14a and the outer member 1, 1a, these surfaces urge the balls 6, 6a into a plane of synchronizing motion, which bisects the angle included by the axes of the members. As a result, as the inner member is pivotally moved relative to the outer member, the guiding elements 17, 17a are displaced relative to each other into the plane of synchronizing motion. Tests have confirmed that contrary to known other synchronizing torque-transmitting universal joints, where the balls 6, 6a are often jammed in the guiding grooves 5, 5a, 13, 13a if the members of the joint include a small angle, such jammed can occur in the present joint only if there is an extremely large radial play between the balls and their guides in the guiding elements or if there is a large axial play of the guiding elements 17, 17a between the guiding surfaces 22, 23, 22a, 23a. In contrast, this jammed of the balls is often observed in joints comprising known control means when the members of the joint include a small angle; this may be due to a failure of the control as a result of the tolerances and the summation of the amounts of play between the relatively moving elements even when all parts are machined exactly as in the known control means those elements which guide the balls into the plane of synchronizing motion are directly and rigidly connected so that the undesired summation results. This leads to the conclusion that in the embodiments shown in the drawing a less accurate machining of the cooperating guiding elements and surfaces is permissible for a control with the same accuracy as in equivalent known torque-transmitting universal joints.

Jamming of the torque-transmitting balls may be also avoided if the guiding surfaces 22, 23, 22a, 23a or those guided surfaces 21, 21a of the guiding elements 17, 17a which contact these surfaces are designed so that, at least if the members of the joint include a small angle, the guiding elements 17, 17a constrain the balls to move to an actual position in which they lead the position theoretically corresponding to the displacement. Because the direction in which the controlling forces act on the balls are properly selected and all controlling elements are supported in the cage, no free forces which would act on the balls and the cage and would disturb the operation are produced. In case of an axial displacement of the shafts relative to each other, regardless whether or not the joint is angled - the joint is axially displaced in itself and the control cage 7, 7a can be axially displaced relative to the outer member so that this displacement results also in a rolling of the balls 6, 6a in their guiding grooves 5, 5a, 13, 13a and the torque is also transmitted while the balls move with rolling friction involving very low frictional losses.

What is claimed is:

1. In a synchronizing torque-transmitting universal joint which comprises an outer member and an inner member disposed in the outer member, the inner and outer members having respective longitudinal axes and being pivotally movable between positions in which the longitudinal axes include different angles and the members being telescopically slidable relative to each other, the outer member having an inside peripheral surface formed with straight guide grooves extending parallel to the longitudinal axis of the outer member, and the inner member having an outside peripheral surface formed with straight guide grooves extending parallel to the longitudinal axis of the inner member; and a plurality of torque-transmitting rolling elements disposed between the inside and outside peripheral surfaces and adapted to be guided by the grooves and to move in a plane which bisects the angle included by the longitudinal axes and thus to cause the members to rotate at the same speed, the improvement of a like plurality of guiding elements each associated with a respective one of the guided rolling elements and slidably guided on the outside peripheral surface between the guide grooves therein, and a guiding cage disposed in the member for axially slidable, but against any pivotal, movement relative thereto, the guiding cage being in sliding contact with the inside peripheral surface and defining inside guiding surfaces arranged to guide the guiding for the rolling elements so as to cause the guiding elements to constrain the rolling elements to move in said plane.

2. A universal joint as set forth in claim 1, in which each of said guiding elements contacts said cage at a point of contact and said point of contact and the center of the associated rolling element lie substantially on a straight line which is parallel to the axis of said inner member.

3. A universal joint as set forth in claim 1, in which said guiding surfaces have an involute shape in axial section.

* * * * *